UNITED STATES PATENT OFFICE.

PERCY A. BOECK, OF LOS ANGELES, CALIFORNIA, ASSIGNOR TO CELITE PRODUCTS COMPANY, OF LOS ANGELES, CALIFORNIA, A CORPORATION OF CALIFORNIA.

METHOD OF METALLURGICAL FILTRATION.

1,245,557.     Specification of Letters Patent.     Patented Nov. 6, 1917.

No Drawing.     Application filed November 3, 1914. Serial No. 870,164.

*To all whom it may concern:*

Be it known that I, PERCY A. BOECK, a citizen of the United States, residing at Los Angeles, in the county of Los Angeles and State of California, have invented a new and useful Method of Metallurgical Filtration, of which the following is a specification.

This invention relates to a method of filtering solutions or slimes containing mineral matter in suspension, and the main object of the invention is to facilitate the separation from such solutions, of very finely divided mineral matter which is liable to clog ordinary filters or filter presses.

My invention provides for incorporation with the liquid to be filtered, of sufficient kieselguhr to form a porous or open bed or cake in the filter and to overcome or reduce the clogging action of the slimes, etc., so as to insure effective filtration.

An important object of the present invention is to provide for effective distribution of the kieselguhr in the body of liquid and suspended matter which is being filtered, in such manner that the kieselguhr is enabled to maintain the open condition of the deposit on the filter surface, as the solid material accumulates thereon.

My invention is preferably carried out as follows: The kieselguhr, in massive condition, as it comes from the quarries, or crushed to any desired size, is incorporated with the body of mineral being treated, preferably during the crushing of the mineral, or the reduction thereof to a finely divided state by grinding or otherwise, so that the kieselguhr is crushed or ground along with the mineral and becomes more or less mixed therewith during the crushing and agitation thereof. The mineral matter, together with the kieselguhr, is mixed, either during the crushing or grinding operation, or by a subsequent mixing and agitating operation, with a liquid required for treatment of the mineral, and the slimes or solution containing the mineral matter and the finely divided kieselguhr in suspension is then passed to a suitable filter, wherein the liquid is extracted or removed from the solid matter, the kieselguhr being retained in or on the filter along with the other solid matter and serving to maintain the porosity of the cake or bed of solid material during the filtering operation.

The mixing of the kieselguhr with the slimes, or body of mineral and liquid to be treated, may be carried out otherwise than as above described. For example, the kieselguhr may be crushed or ground to a state of fine division before introduction into the body of mineral and liquid, and may be mixed with such mineral and liquid by agitation therewith, for example, in the usual agitator used in leaching operations. Or, in some cases, the finely divided kieselguhr may be mixed with the solution or slimes after the latter is drawn off from the agitator and before it is filtered.

My improved method of filtration may be applied in connection with a cyaniding process, as follows: The kieselguhr may be incorporated into the body of ore during the crushing thereof, or crushed along therewith, as above stated, and the mixture of ore and kieselguhr then introduced into the usual agitator, wherein the ore is subjected to the action of cyanid solution, in the usual manner, the mixture being agitated as usual and this agitation resulting in a further mixing or distribution of the kieselguhr in the body of mineral and solution. The presence of the kieselguhr in the body of liquid and mineral at this time is also of advantage in that it facilitates the leaching action, by keeping the mineral distributed or open for access of the solvent.

The liquid is drawn off from the agitator, with or without decantation, as may be desired, such liquid containing the dissolved mineral values and more or less of the insoluble matter in suspension, and is filtered in any suitable apparatus, for example, a filter press, and in this operation the more or less finely divided kieselguhr passes to the filter press along with the other insoluble mineral matter and is deposited on the filtering surface along with such mineral matter. It is a distinctive quality of the kieselguhr that it is inherently porous, that is to say, each particle thereof is porous, and as the kieselguhr is distributed throughout the mineral mass deposited on the filter surface and between the particles of slime or gangue, it maintains the porosity of the mass as a whole, and prevents or at least, greatly retards, the clogging of the filter surface by the slimes or fine particles of gangue. As the solid mineral material accumulates on the filter surface, the kieselguhr accumulates along therewith, and maintains the openness of the bed or cake, and also expedites the formation of a cake of proper thickness for effective filtration.

The amount of kieselguhr used will depend on the nature and consistency of the slimes or material being treated. In the treatment of slimes in the cyaniding process, satisfactory results in filtration may be obtained by the use of, say ten parts, by weight, of kieselguhr to one hundred parts of total solid matter.

My improved method of filtration may be used in connection with either gravity, pressure or vacuum filtration. The method is especially advantageous in pressure filtration, the use of kieselguhr in such an operation serving to reduce the time of forming a filter cake of proper thickness and quality, as much as twenty-five per cent., and also increasing the recovery of values from the cake as much as fifteen per cent. The use of kieselguhr has an especial advantage where air treatment is required in the filter press, the kieselguhr serving to hold the air in the cake and enabling the same to pass uniformly through the cake without causing air-cracks. It also enables more effective removal of the values from the cage by displacement of the solution by water or otherwise.

It is an important feature of my invention that the kieselguhr used as a means for aiding filtration is nearly pure silica, and is chemically inert with reference to the substances to be filtered. It therefore does not interfere with the action of the leaching agent in any way or affect the chemical condition of the lixiviate.

What I claim is:

1. The method of treating ores, which consists of forming a mixture of divided ore and divided inert, porous, mineral material, together with a leaching liquid, and filtering such mixture.

2. The method of treating ore, which consists in forming a mixture of finely divided ore and kieselguhr, together with a liquid for dissolving the values in the ore, and then filtering such mixture.

In testimony whereof I have hereunto set my hand, at Los Angeles, California, this 21st day of October, 1914.

PERCY A. BOECK.

Witnesses:
W. DIETERLE,
A. W. KNIGHT.

Correction in Letters Patent No. 1,245,557.

It is hereby certified that in Letters Patent No. 1,245,557, granted November 6, 1917, upon the application of Percy A. Boeck, of Los Angeles, California, for an improvement in "Methods of Metallurgical Filtration," an error appears in the printed specification requiring correction as follows: Page 2, line 28, for the word "cage" read *cake;* and that the said Letters Patent should be read with this correction therein that the same may conform to the record of the case in the Patent Office.

Signed and sealed this 5th day of March, A. D., 1918.

[SEAL.]

Cl. 75—18.

R. F. WHITEHEAD,
*Acting Commissioner of Patents.*